Nov. 8, 1955

M. W. KORDAS ET AL 2,723,009

IGNITION CONTROLLED SAFETY LOCK
FOR HYDRAULIC BRAKE SYSTEM
Filed July 18, 1951

Inventors
Martin W. Kordas
Frank Kordas
Wooster & Davis Attorneys

United States Patent Office 2,723,009
Patented Nov. 8, 1955

2,723,009

IGNITION CONTROLLED SAFETY LOCK FOR HYDRAULIC BRAKE SYSTEM

Martin W. Kordas and Frank A. Kordas, Greenwich, Conn.

Application July 18, 1951, Serial No. 237,345

6 Claims. (Cl. 192—3)

This invention relates to a safety cut-out for hydraulic brakes, and has for an object to provide a simple and effective device to prevent the accidental release of the hydraulic or service brakes of a motor car when the car is parked. For example, if the car is left parked with children in it, and the parking brake set or the car left in gear, or both, the children might release the parking brake and/or shift the gears into neutral, with the result that if the car is on a grade it would naturally roll out of control; or the parking brake or gear shift might be released accidentally or by other means, with a similar result. It is therefore an object of this device to prevent the accidental release of the hydraulic brakes so that should the parking brakes be released or the gears shifted to neutral, the car will still be prevented from rolling out of control.

With the foregoing and other objects in view, we have devised the construction illustrated in the accompanying drawing forming a part of this specification. It is, however, to be understood the invention is not limited to the specific details of construction and arrangement shown, but may embody various changes and modifications within the scope of the invention.

Figure 1:
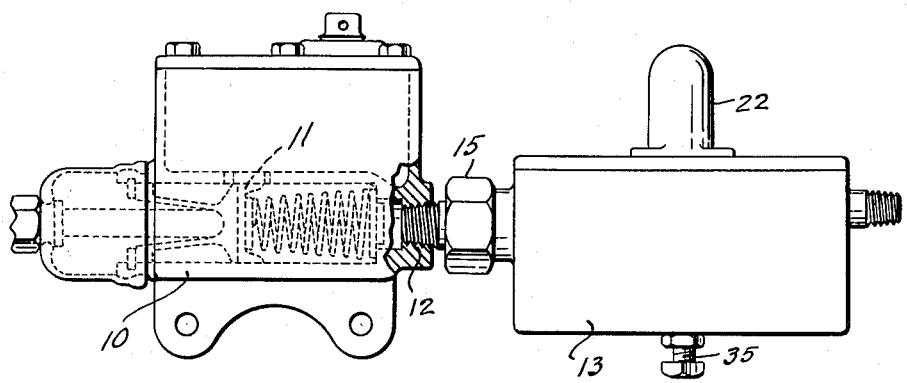
Figure 2:
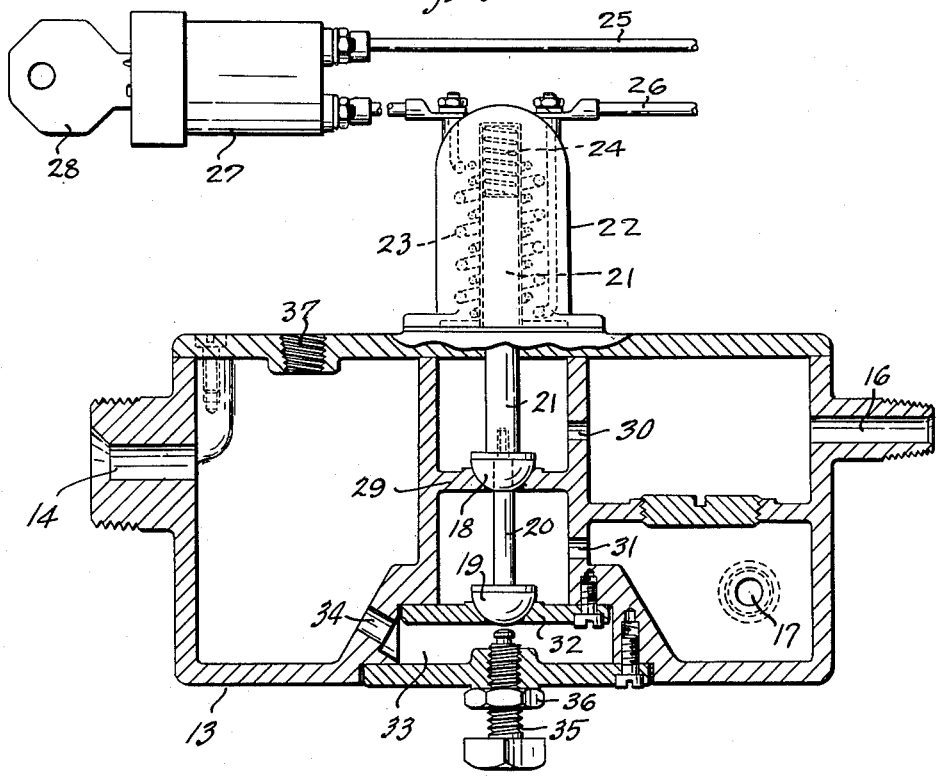

In this drawing:

Fig. 1 is a side elevation showing the device in relation to the master cylinder of the hydraulic brakes, with parts broken away, and Fig. 2 is a partial side elevation and partial section of the device.

The master cylinder of the hydraulic or service brake system of a motor car is indicated at 10, including the piston or plunger 11 operated in the usual manner from the brake pedal by mechanism not shown. The outlet from the cylinder is indicated at 12 connected to this safety cutout device, comprising the housing or casing 13 having an inlet 14 connected to the outlet 12 of the master cylinder by any suitable coupling 15. There are outlets 16 and 17 from this housing or casing connected to suitable conduits or brake lines (not shown) leading to the brake cylinders, and therefore this device is located between the master cylinder and the brake cylinders, and is preferably located immediately at the outlet end of the master cylinder. Located in this housing is a valve mechanism comprising two movable valve elements 18 and 19 connected together by the stem 20, and they are both connected to the stem 21 leading through the top of the housing into a cap or enclosure 22 housing a solenoid 23 embracing the upper end of the stem 21 which forms an armature in the solenoid, and a spring 24 tends to shift this plunger and the valves downwardly to the closed position.

The solenoid 23 is connected in the ignition circuit for the motor of the car indicated by the leads 25 and 26 connected to the ignition switch 27 operated by the usual key 28. The solenoid is connected in series with this circuit. The upper valve member 18 controls a passage through the cross wall 29 leading to an opening 30 communicating with the outlet 16 which leads through suitable brake lines to either the forward or rear brake cylinders, in this case the rear brakes. The other outlet 17 leads by similar brake lines to the front brake cylinders, and communicates through an opening 31 with a passage through the cross wall 32 controlled by the lower valve element 19 from the chamber 33 communicating through passage 34 with the inlet 14.

There may be a connection 37 in the top of the housing 13 for connection of a pressure operated control switch (not shown) for the stop light.

In operation, when the ignition is turned on by closing the switch 27, current passes through the solenoid 23 and lifts the valve, including the valve elements 18 and 19, from their seats, thus opening the passages for liquid through the housing 13 from the inlet 14 from the master brake cylinder to the outlets 16 and 17 to the brake cylinders and permitting operation of the hydraulic brakes in the usual manner. When parking the car the hydraulic brakes can be applied, and as soon as the ignition is turned off by opening the ignition switch 27, the valve, including the valve elements 18 and 19, automatically drops to the closed position, either under the weight of the valve elements and the stem, or action of the spring 24 or both. In this position even when the brake pedal is released the pressure cannot flow back from the brake cylinders but is maintained in them and therefore the hydraulic brakes are held on, and even though the parking or emergency brake should be released, and the transmission thrown into neutral, the car is still held by the hydraulic or service brakes. As soon as the ignition switch is again turned on, the valve, including the elements 18 and 19, is lifted by the solenoid 23, permitting release and operation of the hydraulic or service brakes in the usual manner. Even should the ignition be turned off while the hydraulic brakes are released, they can still be set from the master cylinder and the brake pedal because pressure from the master cylinder under the valve elements 19 and 18 will lift the valve to permit the liquid to flow to the brake cylinders. However, pressure in the opposite direction will tend to hold the valve elements closed and therefore the brakes when once set cannot be released when the ignition is turned off unless some separate means is provided for lifting the valve elements. Such an emergency release is shown at the lower part of the housing and comprises a screw 35 below the lower valve element 19 and normally secured in the retracted position by a lock nut 36. In an emergency this screw can be screwed in to lift the valve sufficiently to release the brakes. This would be used only in an emergency, where for some reason the electric system does not operate when the ignition is turned on, such as, for example, when the battery is dead or the electrical connections are broken.

The use of the double outlets 16 and 17 connected respectively to the rear and forward brake cylinders is preferred to a single connection to all cylinders, because in the case of the single connection, should there be a leak in one cylinder it would permit release of the pressure in this cylinder and would also permit release in all of the cylinders as they would be connected together, and would therefore permit release of the brakes. With this double connection, however, as shown, one to the rear brake cylinders and one to the forward brake cylinders, should a leak occur, for example, in one of the rear brakes, and thus permit loss of pressure in the rear brake cylinders and thus release of the rear brakes, pressure would still be maintained in the front brakes, which would still maintain braking and parking control of the car.

It will be understood from the above that the device is a very simple one which may be readily connected in the brake system between the master cylinder and the control the brakes and maintain the hydraulic or service brakes in the applied position without requiring any separate operations by the operator, so that there will be no danger of his forgetting to apply or set the safety device when parking the car, and unless he fails to apply the brakes when parking the car there will be no chance of his inadvertently leaving the car parked without this safety device properly set to function to prevent inadvertent release of the parked car. Other means could be provided for releasing the pressure in the brake cylinders independently of the solenoid in an emergency, instead of the screw for lifting the valve.

Having thus set forth the nature of our invention, we claim:

1. In a motor vehicle provided with a hydraulic brake system including a master cylinder and front and rear brake cylinders connected with the master cylinder and a manually controlled ignition switch controlling the ignition circuit to the motor, a safety cut-out located between the master cylinder and the brake cylinders comprising a control valve having an inlet connected to the outlet from the master cylinder and separate liquid outlets connected to the rear and front brake cylinders respectively, said valve including separate valve elements controlling passage of liquid from the inlet to the respective outlets, a solenoid connected in the motor ignition system to shift the valve elements to and retain them in open position when the motor ignition switch is closed to permit free flow of liquid in both directions between the master and brake cylinders, and a spring to automatically shift the valve elements to closed position when the switch is open to prevent release of pressure from the brake cylinders.

2. In a motor vehicle provided with a hydraulic brake system including a master cylinder and a brake cylinder connected with the master cylinder and a manually controlled ignition switch controlling the ignition circuit to the motor, a safety cut-out comprising a valve located between the master cylinder and the brake cylinder capable when closed of preventing release of pressure from the brake cylinder, a solenoid for operating the valve and connected in the ignition system so as to be controlled by the motor ignition switch to shift the valve to and retain it in open position when the ignition switch is closed to permit free flow of liquid between the master and brake cylinders, said valve arranged to close automatically when the switch is open and held closed by back pressure from the brake cylinder, and separate means independent of the solenoid for shifting the valve to open position to release the pressure in the brake cylinder.

3. In a hydraulic brake system for a motor vehicle including a master cylinder and a brake cylinder connected with the master cylinder and a key controlled ignition switch controlling the ignition circuit to the motor, a safety cut-out located between the master cylinder and brake cylinder comprising a casing providing with an inlet connected to the outlet from the master cylinder connected with the master cylinder and a manually controlled ignition switch controlling the ignition circuit to the motor, a safety cut-out comprising a valve located between the master cylinder and the brake cylinder capable when closed of preventing release of pressure from the brake cylinder, electrical means connected in series in and controlled by the motor ignition circuit to open said valve and retain it in the open position when the switch is closed to permit free flow of liquid in either direction between said cylinders when the ignition circuit is closed, and means to automatically close said valve when the switch is open to prevent release of pressure from the brake cylinder when the ignition circuit is open.

5. In a motor vehicle provided with a hydraulic brake system including a master cylinder and front and rear brake cylinders connected with the master cylinder and a manually controlled ignition switch controlling the ignition circuit to the motor, a safety cut-out located between the master cylinder and the brake cylinders comprising a control valve having an inlet connected to the outlet from the master cylinder and separate liquid outlets connected to the rear and front brake cylinders respectively, said valve including separate valve elements controlling passage of liquid from the inlet to the respective outlets, means connected in series in and controlled by the motor ignition circuit for shifting said valve elements to and retaining them in the open position when the ignition circuit is closed to permit free flow of liquid in both directions between the master and brake cylinders, and means to automatically shift the valve elements to closed position when the ignition circuit is open to prevent release of pressure from the brake cylinders.

6. In a motor vehicle provided with a hydraulic brake system including a master cylinder and a brake cylinder connected with the master cylinder and a manually controlled ignition switch controlling the ignition circuit to the motor, a safety cut-out comprising a valve located between the master cylinder and the brake cylinder capable when closed of preventing release of pressure from the brake cylinder, a solenoid connected in series in and controlled by the motor ignition circuit to shift the valve to and retain it in open position when the motor ignition circuit is closed to permit free flow of liquid in both directions between the master and brake cylinders, and a spring to automatically close the valve when the ignition circuit is open to prevent release of pressure from the brake cylinder.

References Cited in the file of this patent

UNITED STATES PATENTS

| Number | Name | Date |
|---|---|---|
| 1,972,300 | Hemingway | Sept. 4, 1934 |
| 2,031,062 | Peabody | Feb. 18, 1936 |
| 2,080,603 | Cometto | May 18, 1937 |
| 2,220,465 | Spotz | Nov. 5, 1940 |
| 2,235,412 | Weiss | Mar. 18, 1941 |
| 2,256,348 | Mosher | Sept. 16, 1941 |
| 2,289,563 | Wood | July 14, 1942 |
| 2,345,280 | Morgan | Mar. 28, 1944 |